(12) United States Patent
Chu et al.

(10) Patent No.: US 10,397,044 B2
(45) Date of Patent: Aug. 27, 2019

(54) NETWORK FUNCTION VIRTUALIZATION ("NFV") BASED COMMUNICATIONS NETWORK RESILIENCE

(71) Applicant: New York University, New York, NY (US)

(72) Inventors: Cing-Yu Chu, Brooklyn, NY (US);
Yang Xu, Livingston, NJ (US);
Jonathan Chao, Holmdel, NJ (US)

(73) Assignee: New York University, New York, NY (US)

( * ) Notice: Subject to any disclaimer, the term of this patent is extended or adjusted under 35 U.S.C. 154(b) by 32 days.

(21) Appl. No.: 15/872,746

(22) Filed: Jan. 16, 2018

(65) Prior Publication Data

US 2018/0205596 A1 Jul. 19, 2018

Related U.S. Application Data

(60) Provisional application No. 62/445,739, filed on Jan. 13, 2017.

(51) Int. Cl.
*H04L 12/24* (2006.01)
*H04L 29/08* (2006.01)
(Continued)

(52) U.S. Cl.
CPC .......... *H04L 41/0659* (2013.01); *H04L 45/22* (2013.01); *H04L 45/28* (2013.01);
(Continued)

(58) Field of Classification Search
None
See application file for complete search history.

(56) References Cited

U.S. PATENT DOCUMENTS

| 8,264,955 | B2 * | 9/2012 | Chao | H04L 41/0668 370/227 |
| 9,485,135 | B1 * | 11/2016 | Sarkar | H04L 41/0654 |

(Continued)

*Primary Examiner* — Otis L Thompson, Jr.
(74) *Attorney, Agent, or Firm* — John C. Pokotylo; Pokotylo Patent Services

(57) ABSTRACT

The problem of recovering from multiple link failures in a way that is quick, avoids loops, avoids packet modifications, and that avoids significant modifications to existing routers is solved by: (1) associating a network rerouting unit (NRU) with each of the plurality of routers; (2) configuring each router so that if a link (or more specifically, any link) directly connected to the router fails, the router redirects any packets whose next hop is a port terminating an end of the failed link to the NRU associated with the router; (3) executing a routing protocol on each of the NRUs whereby each NRU will learn a topology of the communications network; (4) receiving by a first NRU, a packet redirected from the router associated with the first NRU; and (5) responsive to receiving, by the first NRU, the packet redirected from the router associated with the first NRU, (i) identifying a link directly connected to the router as a failed link using a destination address in the redirected packet, and the topology of the network learned by the first NRU, (ii) determining an alternative path to the destination address of the redirected packet bypassing the identified failed link, and (iii) tunneling the redirected packet to an intermediate node on or associated with the alternative path using encapsulation. NRUs provide more programmability and better flexibility, thereby allowing network operators to deploy new network functions and features on demand in a timely and agile manner. Such NRUs provide resilience as a network function ("RaaNF") that can be plugged into a running network easily and help the network recover from link failures without modifying existing routers.

20 Claims, 10 Drawing Sheets

(51) Int. Cl.
*H04L 12/741* (2013.01)
*H04L 12/707* (2013.01)
*H04L 12/703* (2013.01)

(52) U.S. Cl.
CPC .......... *H04L 45/54* (2013.01); *H04L 67/2842* (2013.01); *H04L 41/12* (2013.01); *H04L 2212/00* (2013.01)

(56) References Cited

U.S. PATENT DOCUMENTS

| | | | |
|---|---|---|---|
| 2005/0238007 A1* | 10/2005 | Taylor | H04L 41/0663 370/389 |
| 2009/0022056 A1* | 1/2009 | Ninan | H04L 43/0882 370/238 |
| 2013/0215769 A1* | 8/2013 | Beheshti-Zavareh | H04L 45/64 370/252 |
| 2013/0336109 A1* | 12/2013 | Previdi | H04L 43/16 370/229 |
| 2013/0336116 A1* | 12/2013 | Vasseur | H04L 45/125 370/235 |
| 2014/0101335 A1* | 4/2014 | Filsfils | H04L 69/166 709/240 |
| 2016/0119255 A1* | 4/2016 | Luo | H04L 49/557 370/218 |
| 2018/0131616 A1* | 5/2018 | LaBerge | H04L 47/125 |
| 2018/0183704 A1* | 6/2018 | Cevher | H04L 45/24 |
| 2018/0316594 A1* | 11/2018 | Wu | H04L 45/02 |

* cited by examiner

300'

300''

NETWORK FUNCTION VIRTUALIZATION ("NFV") BASED COMMUNICATIONS NETWORK RESILIENCE

§ 1. RELATED APPLICATION

This application claims the benefit of U.S. Provisional Patent Application Ser. No. 62/445,739 (referred to as "the '739 provisional" and incorporated herein by reference), filed on Jan. 13, 2017, titled "NFV Enabled Network Recovery Scheme for Arbitrary Multi link Failures" and listing Cing-Yu C H U, Yang X U and H. Jonathan Chao as the inventors. The present invention is not limited to requirements of the particular embodiments described in the '739 provisional.

§ 2. BACKGROUND OF THE INVENTION

§ 2.1 Field of the Invention

The present invention concerns network communications. More specifically, the present invention concerns providing resiliency to a communications network (referred to simply as a "network" or "networks") in the event of link and/or node failures (referred to generally as "link failures" or "failed links" unless expressly stated otherwise).

§ 2.2 Background Information

§ 2.2.1 The Importance of Networks

The Internet is important infrastructure, serving all kinds of services such as video streaming, e-commerce, email, conferencing and calling, social networking, web browsing, etc. Given the interconnected nature of today's communications networks, the performance of the Internet and the services it supports relies on the health of the links connecting routers in the networks. Unfortunately, link failures are not uncommon in today's Internet service provider ("ISP") networks. (See, e.g., the articles, Athina Markopoulou, Gianluca Iannaccone, Supratik Bhattacharyya, Chen-Nee Chuah, and Christophe Diot, "Characterization of Failures in an IP Backbone," *INFOCOM* 2004, *Twenty-third Annual Joint Conference of the IEEE Computer and Communications Societies*, Vol. 4, pp. 2307-2317 (IEEE 2004), and Daniel Turner, Kirill Levchenko, Alex C Snoeren, and Stefan Savage, "California Fault Lines: Understanding the Causes and Impact of Network Failures," *ACM SIGCOMM Computer Communication Review*, Vol. 41, No. 4, pp. 315-326 (2011), both incorporated herein by reference.) Further, the downtime caused by link failures could lead to significant revenue loss if not handled properly and promptly. (See, e.g., the article, D Tweney, "5-Minute Outage Costs Google $545,000 in Revenue," available online at http://venturebeat.com/2013/08/16/3-minute-outage-costs-google-545000-inrevenue (2013), incorporated herein by reference.)

§ 2.2.2 Link Failure and Known Recovery Schemes

Link failure recovery has long been a topic in computer networks. While routing protocols such as Open Shortest Path First ("OSPF") or Intermediate System-to-Intermediate System ("IS-IS") can re-compute routing paths and update forwarding tables by periodically exchanging link state information, packets could be dropped or forwarded incorrectly before discovery of the failed link(s), computation of new routing paths and update of forwarding tables (referred to as "re-convergence"). To avoid delays in routing protocol re-convergence and the consequent potential packet losses, different schemes have been proposed to provide fast re-routing in Internet protocol ("IP") networks. More specifically, instead of waiting for new routing paths to be computed, some fast re-routing schemes aim to guarantee that the packets can still be forwarded (e.g., within a very short time period) upon link failures in the network. One such scheme is to pre-configure a set of backup paths for each link failure scenario. Unfortunately, however, this only works well with single link failures since enumerating all possible multiple link failure combinations is not feasible given the sheer number of possible failure combinations. (Note that multiple link failures may become more common in networks in which optical switches provide a transport layer, and an overlay of routers provides an IP layer, such as in IP over DWDM.) To address multiple link failures, most approaches apply a set of forwarding rules at each router and then use the set of forwarding rules to form backup paths dynamically when link failures take place. That is, most recovery schemes pre-install or pre-configure a set of forwarding rules and decide which rule to use based on different conditions (e.g., input port, tree ID, link direction for reversal, etc.) Therefore, packets are forwarded without knowing all the failed links or the final re-routing paths.

While some existing schemes can handle link failures efficiently, most require modifications to existing routers (such as routers already deployed in networks). Such modifications might include, for example, structural changes to the forwarding table of the router, changes to how each router processes packets, etc. An unfortunate consequence of adopting such schemes is that they would likely require significant hardware upgrades, which in turn require significant cost and man power. Furthermore, once deployed, making further changes could be difficult if further hardware changes are needed. Thus, schemes requiring hardware changes to routers are disfavored because they are not "agile."

Most link failure recovery schemes focus on keeping packets flowing after a link failure occurs by applying certain pre-configurations. With the Internet Engineering Task Force ("IETF") IP Fast Re-Route ("IPFRR"), IPFRR-Loop Free Alternative ("IPFRR-LFA") (See, e.g., the article, Alia K. Atlas and Alex Zinin, "Basic Specification for IP Fast-Reroute: Loop-Free Alternates" (2008), incorporated herein by reference), a different neighboring node is configured as a backup port and next hop to forward the packets affected by a failed link. The chosen next hop should not loop back the packets based on shortest path routing. (Otherwise, a packet may become stuck in a loop and be deleted if its time to live ("TTL") count is exceeded.) However, such a next hop might not always exist. As result, IPFRR-LFA might not be able to recover from all single link failures.

On the other hand, IPFRR Not-Via (See, e.g., the article, S. Bryant, M. Shand, and S. Previdi, "IP Fast Reroute Using Not-Via Addresses," draft-bryant-shand-ipfrr-notvia-addresses-03 (2006), incorporated herein by reference) can recover from all possible single-link failures by assigning a "Not-Via" address to each router interface and computing a recovery path that does not include the failed link. So when a link failure is detected, the router would encapsulate the packets with the Not-Via address and send them through the recovery path.

Instead of configuring a new address, the article, Kang Xi and H. Jonathan Chao, "IP Fast Rerouting for Single-Link/

Node Failure Recovery," *Fourth International Conference on Broadband Communications, Networks and Systems* (2007) *BROADNETS* 2007, pp. 142-151 (IEEE 2007) (incorporated herein by reference), describes a scheme in which a router is configured with both primary and backup ports for each destination. All the backup ports at different routers form a pre-computed backup path to reach the destination and avoid the failed link. Whenever a link failure is detected, the router would send the packets through the backup port, and other routers would also start to use the backup ports upon receiving packets traversing on the backup path.

Although the foregoing approaches can handle single-link failures properly, they cannot be used to guarantee recovery from multi-link failures, which are much more complicated in nature. Through theoretical analysis, the articles, Marco Chiesa, Ilya Nikolaevskiy, Slobodan Mitrovic, Aurojit Panda, Andrei Gurtov, Aleksander Madry, Michael Schapira, and Scott Shenker, "The Quest for Resilient (Static) Forwarding Tables," *International Conference on Computer Communications (INFOCOM)* (2016), and Junda Liu, Aurojit Panda, Ankit Singla, Brighten Godfrey, Michael Schapira, and Scott Shenke, "Ensuring Connectivity Via Data Plane Mechanisms," 10*th USENIX Symposium on Networked Systems Design and Implementation (NSDI* 13), pp. 113-126 (2013) (both incorporated herein by reference) note that it is not possible to handle all multi-link failures using a static routing configuration without packet header rewriting. To address this problem and provide solutions to multi-link failures, further schemes have been proposed recently. For example, a scheme described in the article, Theodore Elhourani, Abishek Gopalan, and Srinivasan Ramasubramanian, "IP Fast Rerouting for Multi-Link Failures," *INFOCOM*, 2014 *Proceedings*, pp. 2148-2156 (IEEE 2014) (incorporated herein by reference), uses a conclusion from graph theory and creates several link-disjoint destination trees for each destination in a network. This scheme then labels each packet with a tree ID to indicate which destination tree a certain packet should traverse over. Whenever a packet encounters a failed link, the router next to the failed link would change the label and switch the packet onto a different destination tree to bypass the failed link. Since each destination tree is link-disjoint, this scheme allows the packets to bypass multi-link failures by switching among different trees. Unfortunately, however, the number of link-disjoint trees is limited by the minimum node degree (i.e., the number of links a router has) in the network. This means that the number of failed links allowed is limited, even if the network could still remain connected with more failures. Also, this scheme imposes per-packet overhead.

To eliminate per-packet overhead, the scheme in the article, Baohua Yang, Junda Liu, Scott Shenker, Jun Li, and Kai Zheng, "Keep Forwarding: Towards k-Link Failure Resilient Routing," *INFOCOM*, 2014 *Proceedings*, pp. 1617-1625 (IEEE) (incorporated herein by reference) associates each input port of a router with a priority table. The packet forwarding decision is then based on this priority table. This scheme allows packets from different input ports to be treated differently, and packets from some input ports may indicate a link failure. For example, receiving packets forwarded from a neighbor router that is closer to the destination of the packets could indicate failure on the normal (i.e., in the absence of link failure(s)) shortest path. By intelligently setting the priority tables, this approach can handle most multi-link failures. Unfortunately, however, as mentioned in this article, loops might occur since each router still makes decisions based on local information (i.e., input port) without knowledge of the big picture (that is, without knowledge of remote parts of the network).

To address limitations regarding a number of simultaneous failures and potential loops, the scheme in the article, Junda Liu, Aurojit Panda, Ankit Singla, Brighten Godfrey, Michael Schapira, and Scott Shenker, "Ensuring Connectivity via Data Plane Mechanisms," 10*th USENIX Symposium on Networked Systems Design and Implementation (NSDI* 13), pp. 113-126 (2013) (incorporated herein by reference) modifies the link reversal algorithm (See, e.g., the article, Eli Gafni and Dimitri Bertsekas, "Distributed Algorithms for Generating Loopfree Routes in Networks with Frequently Changing Topology," *IEEE Transactions on Communications*, 29, 1, pp. 11-18 (1981), incorporated herein by reference) and uses fixed length of information per destination with one additional bit in each packet to handle multiple link failures. Although this approach can discover backup paths with fewer reversals and low path stretch, it requires modifying the data packets.

In addition to the noted limitations of the foregoing approaches, they all require significant modifications to existing routers. Therefore, it would be useful to be able to address multiple link failures in a way that is quick, avoids loops, avoids packet modifications (note that packet encapsulation is not considered to be a modification since the packet itself is preserved within the encapsulation), and that avoids significant modifications to existing routers.

§ 3. SUMMARY OF THE INVENTION

The problem of recovering from multiple link failures in a way that is quick, avoids loops, avoids packet modifications, and that avoids significant modifications to existing routers is solved by: (1) associating a network rerouting unit (NRU) with each of the plurality of routers; (2) configuring each router so that if a link directly connected to the router fails, the router redirects any packets whose next hop is a port terminating an end of the failed link to the NRU associated with the router; (3) executing a routing protocol on each of the NRUs whereby each NRU will learn a topology of the communications network and routers on the network will learn of the existence of NRUs on the communications network; (4) receiving by a first NRU, a packet redirected from the router associated with the first NRU; and (5) responsive to receiving, by the first NRU, the packet redirected from the router associated with the first NRU, (i) identifying a link directly connected to the router as a failed link using a destination address in the redirected packet, and the topology of the network learned by the first NRU, (ii) determining an alternative path to the destination address of the redirected packet bypassing the identified failed link, and (iii) tunneling the redirected packet to an intermediate node on or associated with the alternative path using encapsulation.

In some example methods consistent with the present invention, the intermediate node is determined by the first NRU such that both (1) the intermediate node does not include the identified failed link, and (2) a lowest cost path from the intermediate node to the destination address of the redirected packet does not include the identified failed link.

In some example methods consistent with the present invention, a remote NRU (i.e., one not associated with the router terminating an end of the failed link) can learn about the failure of the remote link. For example, the NRU associated with the intermediate node (e.g., a router, or the NRU itself) receives the redirected packet tunneled. Responsive to receiving the redirected packet tunneled, the example method determines the identified failed link (even though the identified failed link is not directly connected with the intermediate node), using (i) a header of the encapsulation, (ii) a header of the redirected packet, and (iii) the topology of the communications network learned by the NRU associated with the intermediate node. In such an example embodiment, the remote NRU can infer the identity of the (remote) failed link. In an alternative example embodiment, the remote NRU can be informed of the failed link explicitly. More specifically, such an alternative example method may add (e.g., by the first NRU) information identifying the identified failed link to the redirected packet, wherein the information is added before tunneling the redirected packet to the intermediate node on (or associated with) the alternative path using encapsulation. Alternatively, such an alternative example method may (1) add (e.g., by the first NRU), information identifying the identified failed link to the at least one new packet, and (2) tunnel the at least one new packet to the intermediate node on (or associated with) the alternative path using encapsulation.

In some example methods, the "intermediate node" may be determined as follows. First, it may be determined (e.g., by the first NRU) whether or not there is a router in which both (1) a shortest path from the first NRU to the router does not include any known failed link, (including the identified failed link), and (2) a shortest path from the router to a final destination of the redirected packet does not include any known failed link (including the identified failed link). This determination may be made using the learned network topology information. Responsive to a determination that there is a router that meets both of the foregoing criteria, the determined the router is set as the intermediate node. Otherwise, responsive to a determination that there is no router that meets both the foregoing criteria, another NRU is set as the intermediate node. In some example methods, the other NRU set as the intermediate node is a farthest one that the first NRU can reach without using any known failed links (including the identified failed link). Recall that if the intermediate node is an NRU, that NRU will be associated with the alternative path. The intermediate node NRU will perform similar processing, and will therefore also try to find a second intermediate node. This can be repeated whenever an NRU is chosen as the intermediate node.

§ 4. BRIEF DESCRIPTION OF THE DRAWINGS

§ 5. DETAILED DESCRIPTION

Example embodiments consistent with the present invention may involve novel methods, apparatus, message formats, and/or data structures for providing resilience in communications networks. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the example embodiments shown and the inventors regard their invention as any patentable subject matter described.

§ 5.1 Example Environment

Figure 1:
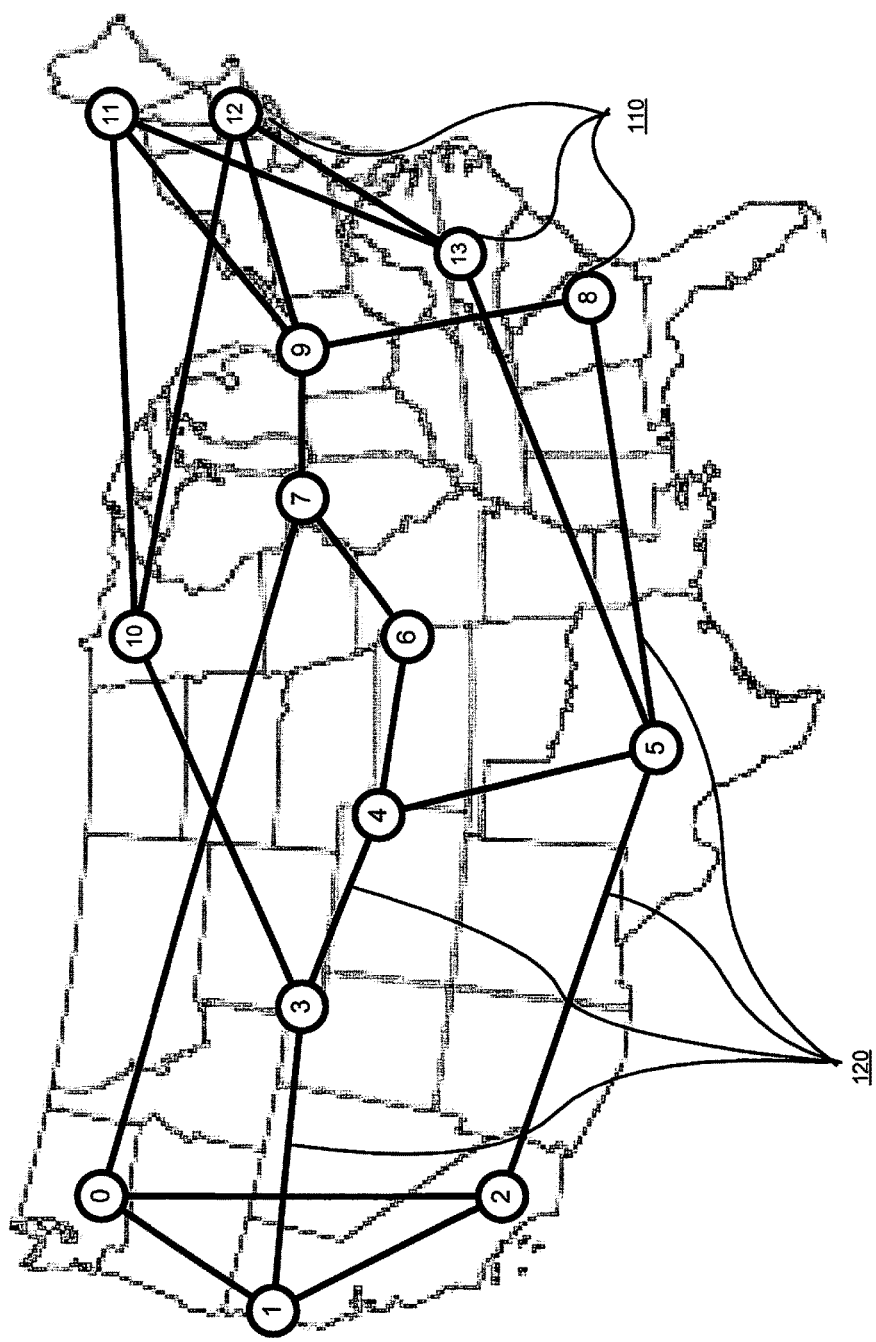
FIG. 1 illustrates an example network environment in which example methods and apparatus consistent with the present invention may be used.

FIG. 1 illustrates an example network 100 in which, or with which, embodiments consistent with the present invention may be used. As shown, the example network 100 includes a plurality of routers 110 (only some of which are labeled), denoted router 0 through router 13 and referred to as R1 through R13, and a plurality of links 120 (only some of which are labeled) connecting the routers 110. The network topology may be different, such as hub-and-spoke, full-mesh, or some hybrid or arbitrary topology. In the topology each of the routers should be reachable by every other router, preferably via multiple alternative paths. Example embodiments consistent with the present invention and described below provide the example network 100 resiliency in the event that one or more links 120 fail. As noted above, a link may go down due to a problem with the link itself, a problem with a node at either end of the link, and/or a problem with an interface at either end of the link. All of these different cases are generally referred to as a link failure, a failed link, or a link going down.

§ 5.2 Example Methods

An example method 200 consistent with the present invention is now described with reference to the flow diagram in FIG. 2. First, a network rerouting unit ("NRU") is associated with each of the plurality of routers 110 of the network 100. (Block 210) Referring to FIG. 3, the NRUs 310 (only some of which are shown, and only some of which are labeled) may be provided on a separate server, and/or on a smart network interface card ("NIC") provided on the router 110 itself.

Referring back to FIG. 2, each router 110 is configured so that if a link 120 (or more specifically, any link) directly connected to the router 110 fails (Recall that a link failure could be a failure of the link itself, or a failure of either of the interfaces terminating the link), the router 110 will redirect any packets whose next hop is a port terminating an end of the failed link to the NRU 310 associated with the router 110. (Block 220) Note that this only requires a small configuration change at the router, and is change is much smaller than changes required to the router by the known schemes set forth in section § 2.2.2 above.

Figure 2:
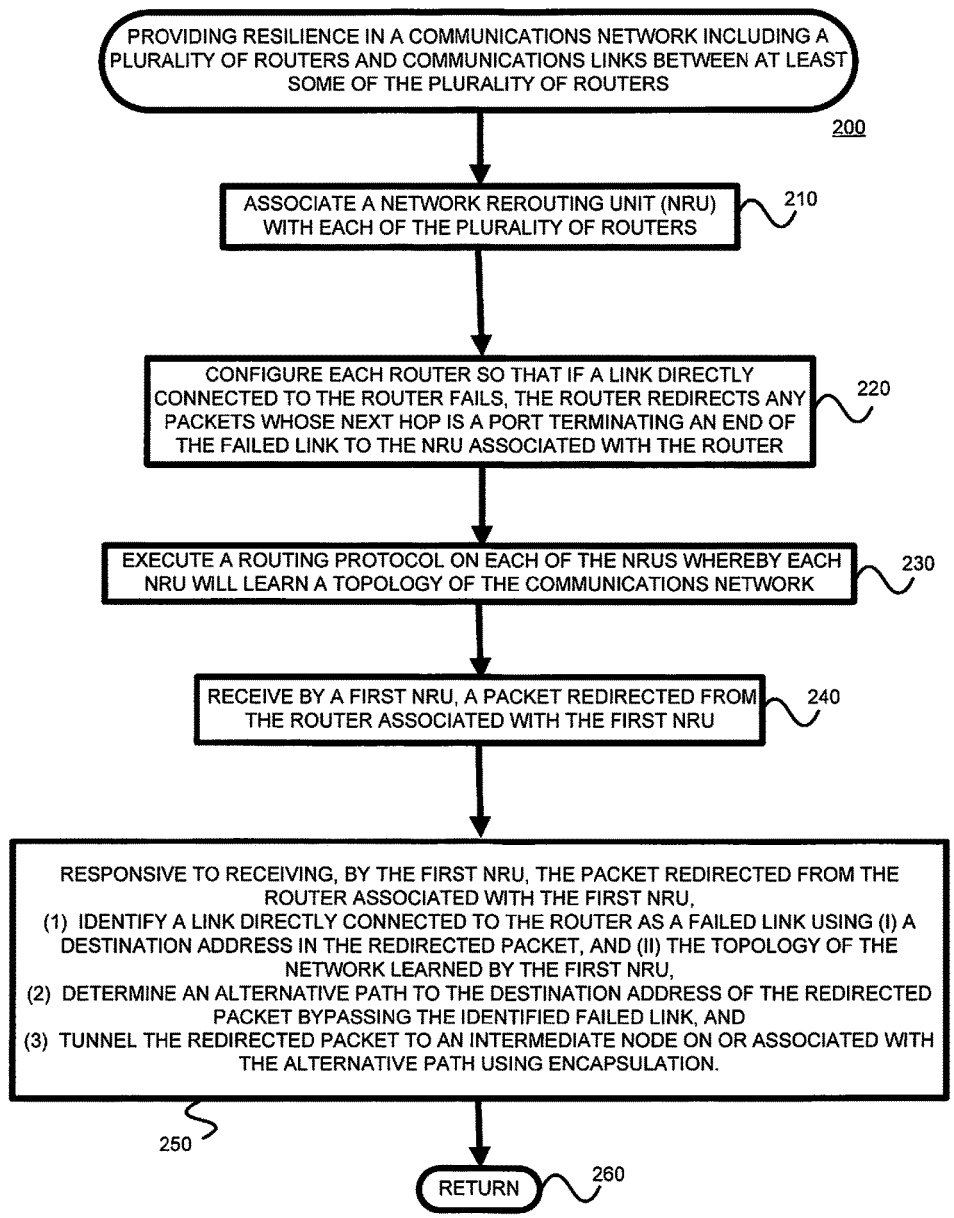
FIG. 2 is a flow diagram of an example method for providing resilience in a communications network, in a manner consistent with the present invention.
Figure 4:
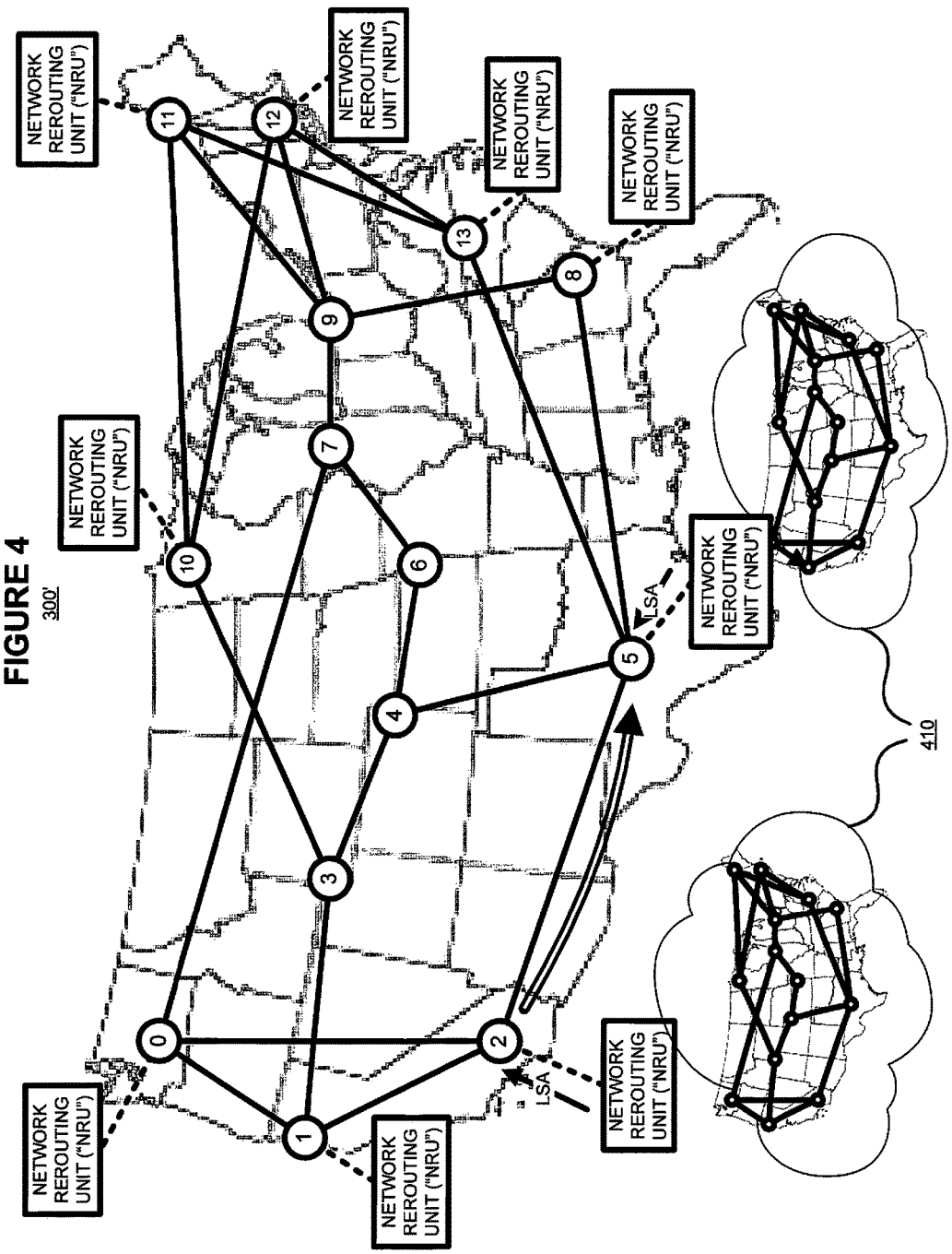

Still referring to FIG. 2, a routing protocol (e.g., OSPF) is performed by each of the NRUs 310, whereby each NRU 310 will learn a topology of the communications network 100. (Block 230) The learned network topology of two of the NRUs are depicted as 410 of FIG. 4.

The foregoing acts (Blocks 210-230) are performed regardless of whether or not a link 120 of the network 100 has failed. The following parts of the example method 200 concern acts that are performed when one or more links 120 of the network 100 fail. Recall from block 220 that each router 110 is configured so that if a link directly connected (The phrase "link directed connected" is intended to include wireless links unless stated otherwise) to the router (also referred to as a "local link") fails, a packet whose next hop is a port terminating an end of the failed link is redirected to the NRU associated with the router. A first NRU (namely, the NRU associated with the router directly connected with a failed link) will then receive a packet redirected from the router associated with the first NRU. (Block 240)

Finally, responsive to receiving, by the first NRU, the packet redirected from the router associated with the first NRU, the example method 200 (1) identifies a link directly connected to the router (that is, the local link) as a failed link using (i) a destination address in the redirected packet, and (ii) the topology of the network learned by the first NRU, (2) determines an alternative path to the destination address of the redirected packet bypassing the identified failed link (also using the learned topology of the network), and (3) tunnels the redirected packet to an intermediate node (which may be a router on the alternative path, or an NRU associated with the alternative path) using encapsulation. (Block 250) The example method 200 is then left. (Node 260)

Referring back to block 250 of the example method 200, in some example methods consistent with the present invention, the intermediate node is determined by the first NRU such that both (1) the intermediate node does not include the identified failed link, and (2) a lowest cost path from the intermediate node to the destination address of the redirected packet does not include the identified failed link.

In some example methods consistent with the present invention, a remote NRU (i.e., one not associated with the router terminating an end of the failed link) can learn about the failure of the remote link. For example, the NRU associated with the intermediate node (e.g., a router, or the NRU itself) receives the redirected packet tunneled. Responsive to receiving the redirected packet tunneled, the example method determines the identified failed link (even though the identified failed link is not directly connected with the intermediate node), using (i) a header of the encapsulation, (ii) a header of the redirected packet, and (iii) the topology of the communications network learned by the NRU (Recall block 230 of FIG. 2) associated with the intermediate node. In such an example embodiment, the remote NRU can infer the identity of the (remote) failed link. In an alternative example embodiment, the remote NRU can be informed of the failed link explicitly. More specifically, such an alternative example method may add (e.g., by the first NRU) information identifying the identified failed link to the redirected packet, wherein the information is added before tunneling the redirected packet to the intermediate node on (or associated with) the alternative path using encapsulation. Alternatively, such an alternative example method may (1) add (e.g., by the first NRU), information identifying the identified failed link to the at least one new packet, and (2) tunnel the at least one new packet to the intermediate node on (or associated with) the alternative path using encapsulation.

Referring back to block 250 of the example method 200 of FIG. 1, in some example methods, the "intermediate node" may be determined as follows. First, it may be determined (e.g., by the first NRU) whether or not there is a router in which both (1) a shortest path from the first NRU to the router does not include any known failed link, (including the identified failed link), and (2) a shortest path from the router to a final destination of the redirected packet does not include any known failed link (including the identified failed link). This determination may be made using the learned network topology information. (Recall block 230) Responsive to a determination that there is a router that meets both of the foregoing criteria, the determined router is set as the intermediate node. Otherwise, responsive to a determination that there is no router that meets both the foregoing criteria, another NRU is set as the intermediate node. In some example methods, the other NRU set as the intermediate node is a farthest one (associated with the alternative path) that the first NRU can reach without using any known failed links (including the identified failed link).

§ 5.3 Example Apparatus

Figure 5:
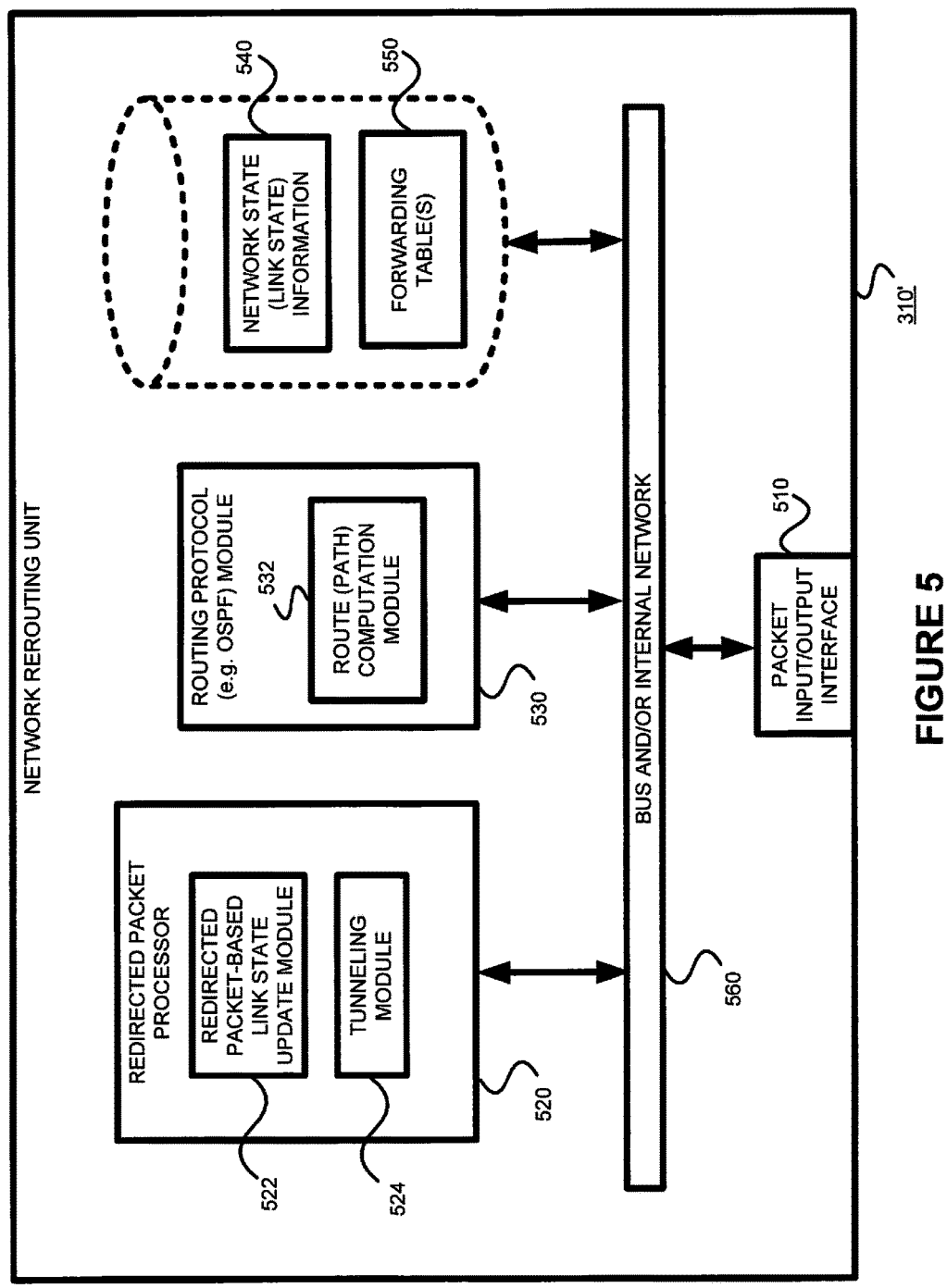
FIGS. 5 and 6 illustrate example apparatus for providing resilience in a communications network, in a manner consistent with the present invention.

FIG. 5 illustrates an example NRU 310' implemented in a manner consistent with the present invention. The example NRU 310' includes a packet input/output interface 510, a redirected packet processor 520, a routing protocol (e.g., OSPF) module 530), stored network state (e.g., link state) information 540, stored forwarding table(s) 550, and a bus and/or internal network 560 which facilitates the communication of control or data signals among the foregoing components of the example NRU 310'. The redirected packet processor 520 may include a redirected packet-based link state update module 522 and a tunneling module 524. The routing protocol (e.g., OSPF) module 530 may include a route (path) computation module 532.

The example NRU 310' may be a server linked with a router (not shown) 110. Alternatively, the example NRU 310' may be a smart NIC provided on the router 110. As yet another alternative, some modules of the example NRU may be provided in a server, while other modules of the example NRU are may be provided in a smart NIC (that is, the modules of the NRU may be distributed). Note that the example NRU may be run on an existing server already deployed for performing other functions (e.g., content caching), thereby leveraging existing infrastructure of the network.

Still referring to FIG. 5, the routing protocol module 530 enables the example NRU 310' to learn a topology of the communications network. This information is stored as network state (e.g., link state) information 540. The route (path) computation module 532 enables the example NRU 210' to determining forwarding table(s) 550 from the network state information 540.

The input/output interface 510 is adapted to receive a packet redirected from the router associated with the example NRU 210', and to forward the encapsulated, redirected packet.

The redirected packet processor 520 is adapted to, responsive to receiving the packet redirected from the router associated with the NRU, identify a link directly connected to the router as a failed (local) link using (i) a destination address in the redirected packet, and (ii) the topology of the network learned by the NRU (i.e., network state information 540). The redirected packet-based link state update module 522 may be used to update the network state information 540 so that the failure of the identified (local) link is reflected in this information 540. The redirected packet processor 520 may then determine an alternative path to the destination address of the redirected packet bypassing the identified failed link. This may be done using the route (path) computation module 532 and the updated network state information 540. Finally, the tunneling module 524 of the redirected packet processor 520 may be used to tunnel the redirected packet to an intermediate node on (or associated with) the alternative path using encapsulation. Although a tunneling module 524 is shown, the tunneling may actually be done by installing encapsulation rules in the forwarding table(s) 550. The intermediate node may be determined in one of the ways described in § 5.2 above.

The packet processor 520 may be further adapted to, responsive to receiving the packet redirected from the router associated with the NRU, add, information identifying the identified failed (local) link to the redirected packet, such that the information is added before tunneling the redirected packet to the intermediate node on (or associated with) the alternative path using encapsulation. Alternatively, the packet processor may be further adapted to, responsive to receiving the packet redirected from the router associated with the NRU, (1) add information identifying the identified (local) failed link to the at least one new packet, and (2) tunnel the at least one new packet to the intermediate node on (or associated with) the alternative path using encapsulation. Such added information will allow a remote NRU receiving the information to add information about the remote link failure to its own network state information. That is, thus far, the example NRU 310' has been discussed in the context of processing a redirected packet received from its associated router. That is, the example NRU 310' has been described in the context of local failed link. Recall, however, that an NRU 310' may also be used as an intermediate node (that is, an NRU remote from the failed link), which receives an encapsulated, redirected packet from a first NRU. In this context, the redirected packet processor of the remote example NRU 210' may use this information (identifying the failed remote link) to update its own network state information.

Figure 6:
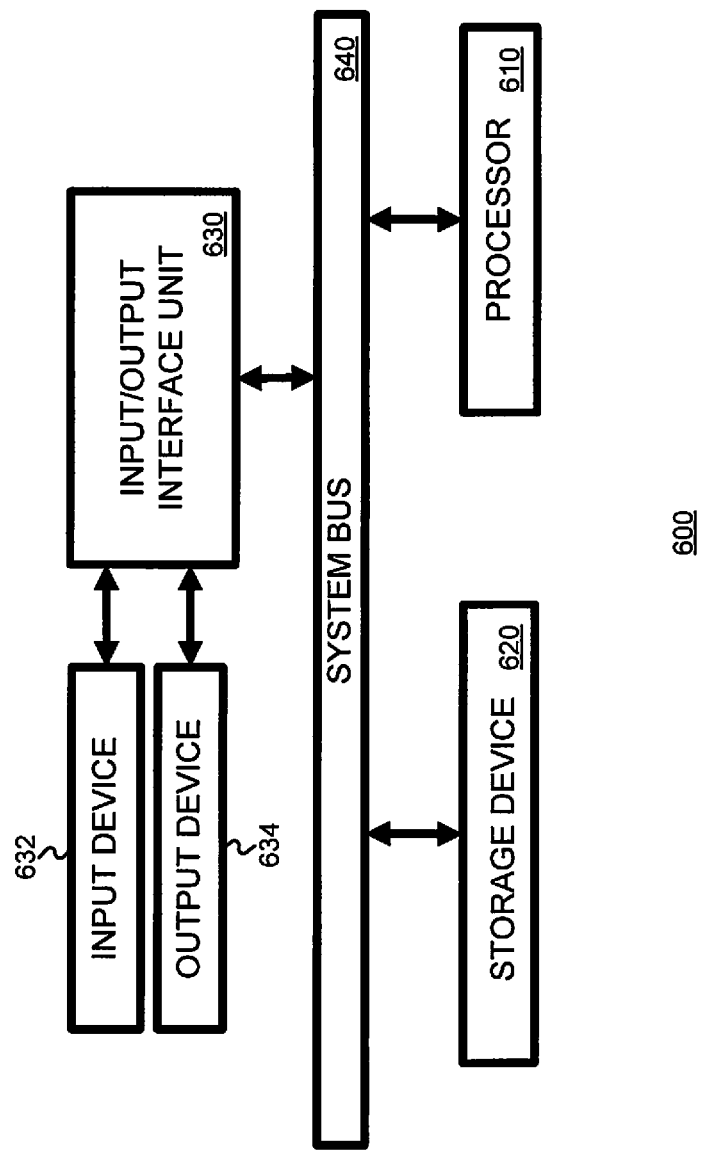

FIG. 6 is a block diagram of exemplary apparatus 600 that may be used to perform operations of various components or modules in a manner consistent with the present invention and/or to store information in a manner consistent with the present invention. The apparatus 600 includes one or more processors 610, one or more input/output interface units 630, one or more storage devices 620, and one or more system buses and/or networks 640 for facilitating the communication of information among the coupled elements. One or more input devices 632 and one or more output devices 634 may be coupled with the one or more input/output interfaces 630.

The one or more processors 610 may execute machine-executable instructions (e.g., C++, Java, etc.) to perform one or more aspects of the present invention. For example, one or more software modules (or components), when executed by a processor, may be used to perform the methods described herein. At least a portion of the machine executable instructions may be stored (temporarily or more permanently) on the one or more storage devices 620 and/or may be received from an external source via one or more input interface units 630.

In one embodiment, the machine 600 may be one or more servers. In such a case, the processing units 610 may be one or more microprocessors. The bus 640 may include a system bus. The storage devices 620 may include system memory, such as read only memory (ROM) and/or random access memory ("RAM"). The storage devices 620 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, and/or solid state memory.

A user may enter commands and information into the device 600 through input devices 632. Such input devices are often connected to the processing unit(s) 610 through an appropriate interface 630 coupled to the system bus 640. The output devices 634 may include a monitor or other type of display device, which may also be connected to the system bus 640 via an appropriate interface. In addition to (or instead of) the monitor, the personal computer may include other (peripheral) output devices (not shown), such as speakers for example.

The modules of the NRU can be implemented with different technologies. For example, one can connect each IP router to a server and implement the NRU with the Data Plane Development Kit ("DPDK") from Intel. Alternatively, NetFPGA can be used to implement the resilience logic and plugged into one of the IP router's port. A Programming Protocol-independent Packet Processors ("P4")-enabled smart NIC can also be used for our purpose with a controller for complicated computation. Alternatively, or in addition, the operations of components or modules, such as those described above, may be performed on one or more computers. Such computers may communicate with each other via one or more networks, such as the Internet for example. Alternatively, or in addition, the various modules, operations, and/or acts described above may be implemented in hardware (e.g., integrated circuits, application specific integrated circuits ("ASICs"), field programmable gate or logic arrays ("FPGAs"), etc.).

§ 5.4 Operational Example of Example Embodiment

Having described example methods and apparatus consistent with the present invention, an operation example of an example embodiment consistent with the present invention is now described.

§ 5.4.1 Network Setup and Components

Figure 3:
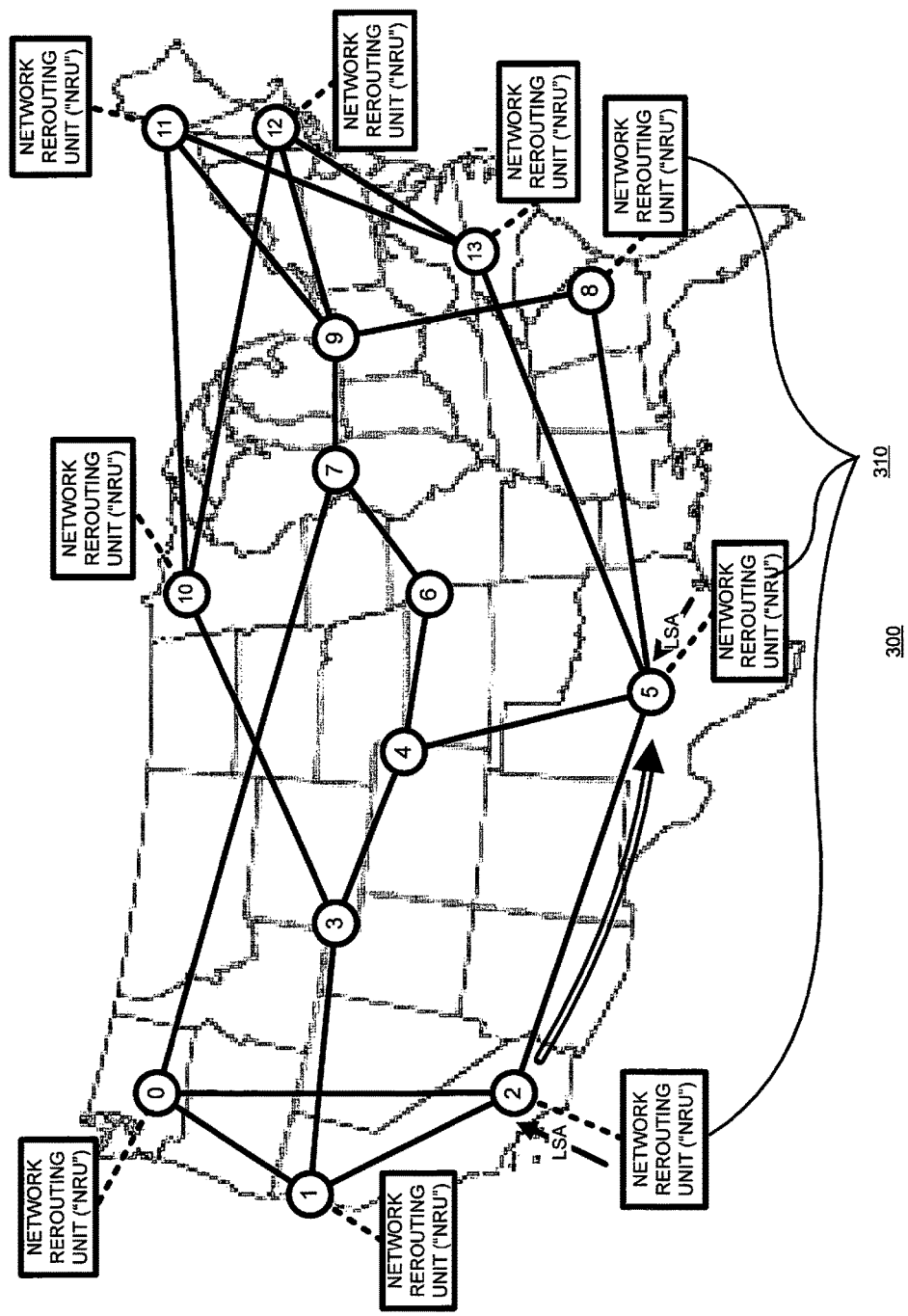
FIGS. 3 and 4 illustrate operations of the example method of FIG. 2 in the example communications network of FIG. 1.

Recall from FIG. 3 and block 210 of FIG. 2 that a server and/or a smart NIC may be used to provide a network function (e.g., functions of an NRU) to each IP router 110 in the network 100. That is, each IP router 110 is associated with a server and/or smart NIC which provides NRU network functions for making re-routing decisions when a link failure occurs.

§ 5.4.2 Router Configurations

Recall from block 220 of FIG. 2, once each IP router 110 has NRU 310 attached to it (and/or embedded on it), each router is configured to react to potential link failures. If it is assumed that an important design goal is to minimize the modification or configuration required on IP routers, the IP routers 110 may be configured such that whenever a link 120 fails, the associated router(s) redirects all packets that would have traversed the failed link 120 to the NRU 310. For example, a router port connecting the NRU 310 may be used as a backup port for all other ports on the same router 110.

As described in further detail below, after all packets affected by the link failure are redirected, the NRU 310 will handle them and re-route the packets to bypass any failed link(s). However, if the underlying routing protocols of the router 110 finish re-computing and updating the forwarding tables (that is, when the updated network information converges), the affected packets may be sent onto the newly computed paths and the router 110 will stop redirecting packets to the NRU 310 since the router 110 itself will avoid the failed link.

§ 5.4.3 NRU Functional Design

Since the only configuration made on IP routers 110 is to redirect packets to the NRUs when link failure happens (in order to minimize any modifications to the routers), all of the intelligence resides on the NRU 310. The NRU 310 is responsible for performing the following tasks.

§ 5.4.3.1 Network Peering

Referring back to block 230 of FIG. 2 and element 540 of FIG. 5, each NRU may participate in routing protocols in the network by running protocols such as OSPF or IS-IS, depending on the routing protocol used in the network. This allows all the routers 110 and NRUs 310 to know the existence of each other and how to reach one another through shortest paths. (Note that the NRUs will not be used as routers, as such, since they are leaf nodes in the network topology.) Such network information is depicted as information 410 in FIG. 4. This is done for the following reasons.

First, by participating in routing protocols, each NRU 310 can learn the full topology of the network 100 (Recall e.g., 540 of FIG. 5), which will be used in alternative path computation. Second, traffic relay among NRUs 310 may be needed. To enable IP routers 110 to correctly forward packets destined to certain NRUs 310, the IP routers 110 likewise need to learn the routes to the NRUs 310 by using routing protocols. Third, this also allows the NRUs 310 to understand the forwarding decisions that will be used by each router 110 in the network 100. The NRUs 310 can use this information to avoid potential loops and make decisions on how to relay affected packets among different NRUs. Finally, learning the full network topology through a routing protocol helps each NRU 310 to determine which link(s) failed upon receiving packets redirected from its local IP router 110.

§ 5.4.3.2 Learning of Local Failures

When an NRU 310 receives packets redirected from its local IP router 110, it can infer that there must be a link failure that triggers this redirection. Since each NRU 310 is a leaf node of the network 100, it can recognize if a packet is redirected by analyzing the packet's destination IP address.

Figure 7:
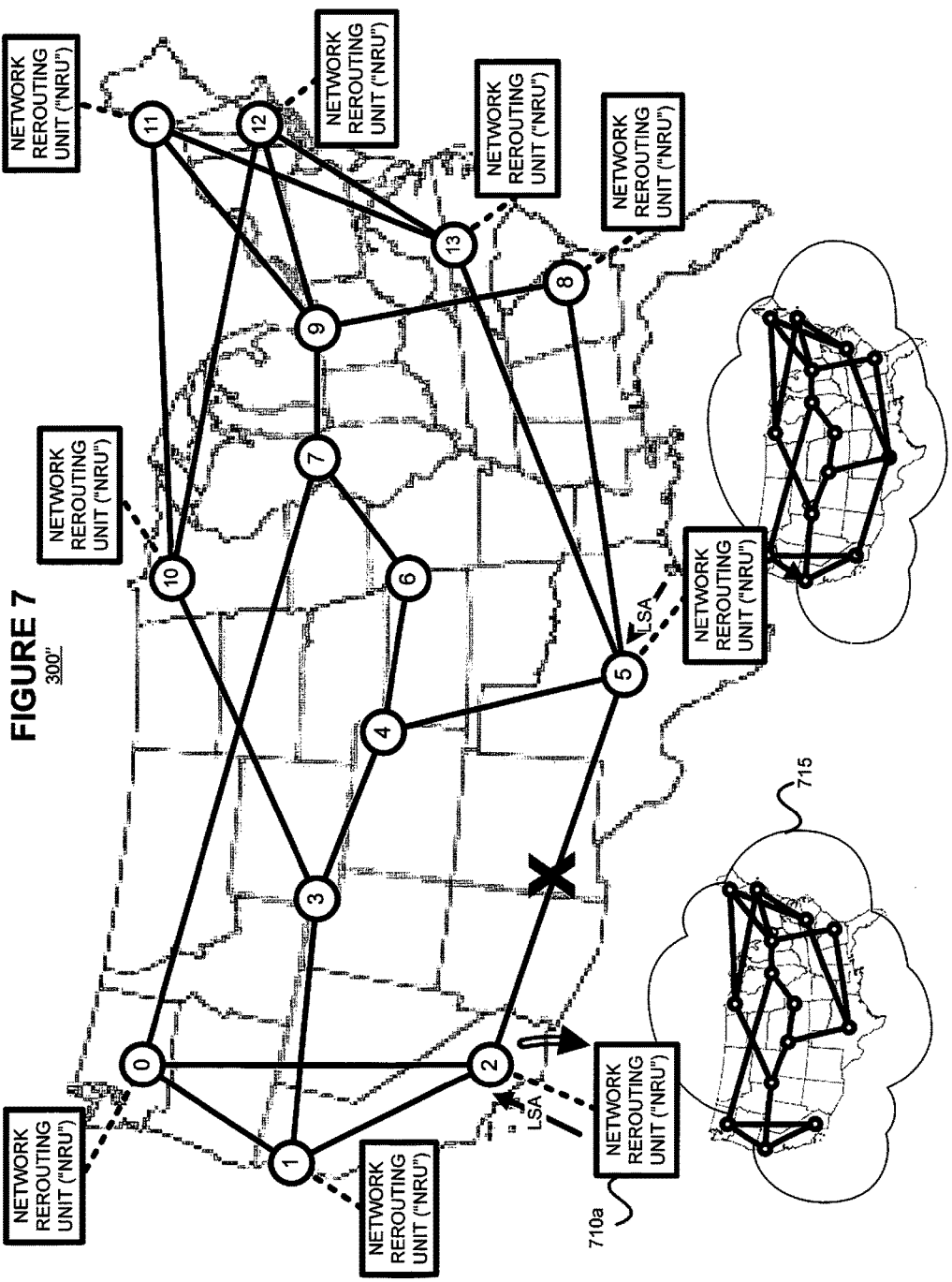
FIGS. 7-9 illustrate operations of the example method of FIG. 2 in the example communications network of FIG. 1.

Given the topology information learned through routing protocol, and the destination IP address in the redirected packets, the NRU 310 can learn which link 120 connected to its local router 110 failed. FIG. 7 shows an example in which packets are sent from router R1 to destination router R5. However, the link connecting R2 and R5 fails as indicated by the "X" notation. As a result, R2 would redirect these packets to its NRU 710a. Upon receiving the redirected packets, NRU 710a obtains the destination IP address and determines that these packets have been redirected from R2 whose final destination should be R5. Since NRU 710a already has learned the network topology 715 and routing paths in the network by executing a routing protocol (Recall, e.g., block 230 of FIG. 2 and element 530 of FIG. 5), it learns that link R2-R5 must have failed as these packets should traverse link R2-R5 when there is no link failure. Note that the NRU updates its routing topology information 715 to reflect its learning of the failed local link.

§ 5.4.33 Alternative Path Computation

After learning which link has failed, the NRU 710a can now use this information to compute an alternative path (e.g., using the information 715 of FIG. 7) to forward the packets and bypass the failed link. While there could be different ways to compute the alternative path based on specific criterion, one way is to use the new shortest path as the alternative path. (However, the alternative path can be computed in different ways.) The new open shortest path is computed by removing the failed link from the original network topology. (Compare 410 of FIG. 4 with 715 of FIG. 7.) Referring to FIG. 2, the new shortest path to reach destination R5 from R2 will be R2→R1→R3→R4→R5, as indicated by the dashed arcs.

§ 5.4.3.4 Packet Encapsulation

After acquiring the alternative path to forward packets affected by the link failure and bypass the failed link, the NRU 710a determines how to realize the alternative path. Since all the routers' forwarding tables remain unchanged right after the link failure (that is, before a protocol message advertising the link failure propagates through the network 100), if the NRU 710a were to simply send out the packets, they would just loop back to the port connected to the failed link. To avoid such a loop, the NRU 710a may realize the alternative path using IP-in-IP encapsulation in order to tunnel the redirected packet(s) to an intermediate node at which the packet(s) will not loop back to the failed link (or to any other known (to the NRU) failed link). More specifically, the affected packets are tunneled to one of the nodes on (or associated with) the alternative path using IP encapsulation. The intermediate node on the alternative path is chosen as a router satisfying two conditions (assuming such a router exists). First, the shortest path from the originating NRU 710a, to the intermediate node does not include the failed link. This ensures that the packets can be forwarded to the intermediate node by the IP routers 110 without using the failed link. Second, the shortest path from the intermediate node to the final destination (R5) should not include the failed link (nor should it include any other link known to be down by the NRU 710a). As an example, R4 can be selected as the intermediate node. If such a router does not exist (that is, if there is no router that satisfies the two foregoing conditions), or if the IP router does not support encapsulation/de-capsulation, the packets should be forwarded to the NRU (710b, not shown in FIG. 7, but shown in FIGS. 8 and 9) associated with the router R4.

§ 5.4.3.5 Learning Remote Link Failure

In addition to learning the link failure from the locally redirected packet from its local router (R2), each NRU can also learn about remote link failures under two conditions.

The first condition is when an NRU is used as the intermediate node (associated with the alternative path). Still reference to FIG. 8, when the remote NRU 710b receives redirected packets sent and encapsulated by the first NRU 710a, it can infer the remote link failure by analyzing both outer and inner IP header. More specifically, when NRU 710a tunnels the packets to NRU 710b, NRU 710b observes two IP headers. The outer header shows from IP address of NRU 710a to NRU 710b, while the inner header shows from IP address of R2 to R5. NRU 710b can then determine that these packets were redirected at R2/NRU 710a. Since NRU 710b has the knowledge of full network topology (since it is running the networking protocol, such as OSPF), it understands that packets destined to R5 should take link R2-R5 under normal operation. Therefore, NRU 710b can infer that the remote link R2-R5 has failed. The NRU 710b will update its network topology (e.g., link state) information accordingly.

Figure 8:
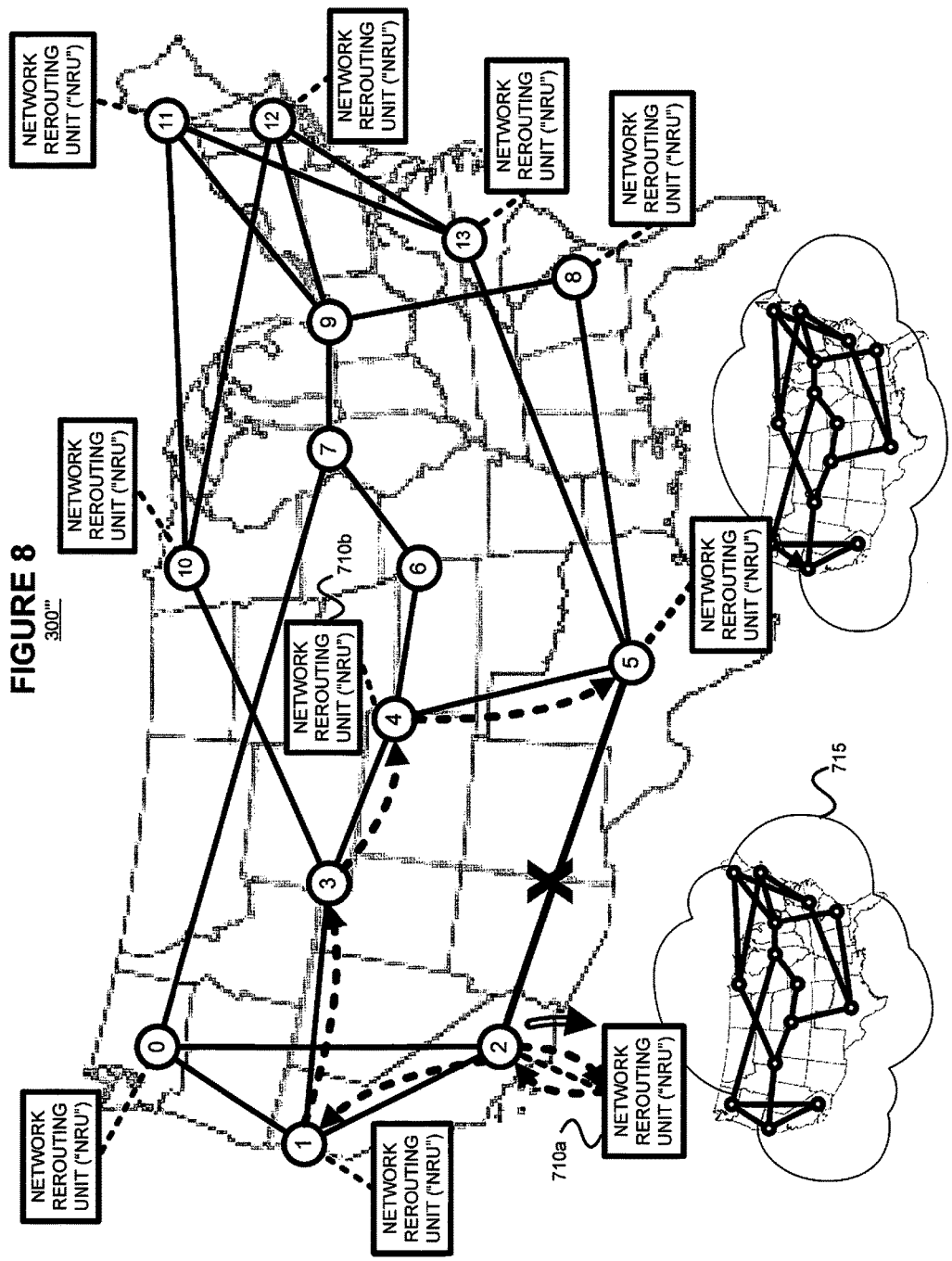
Figure 9:
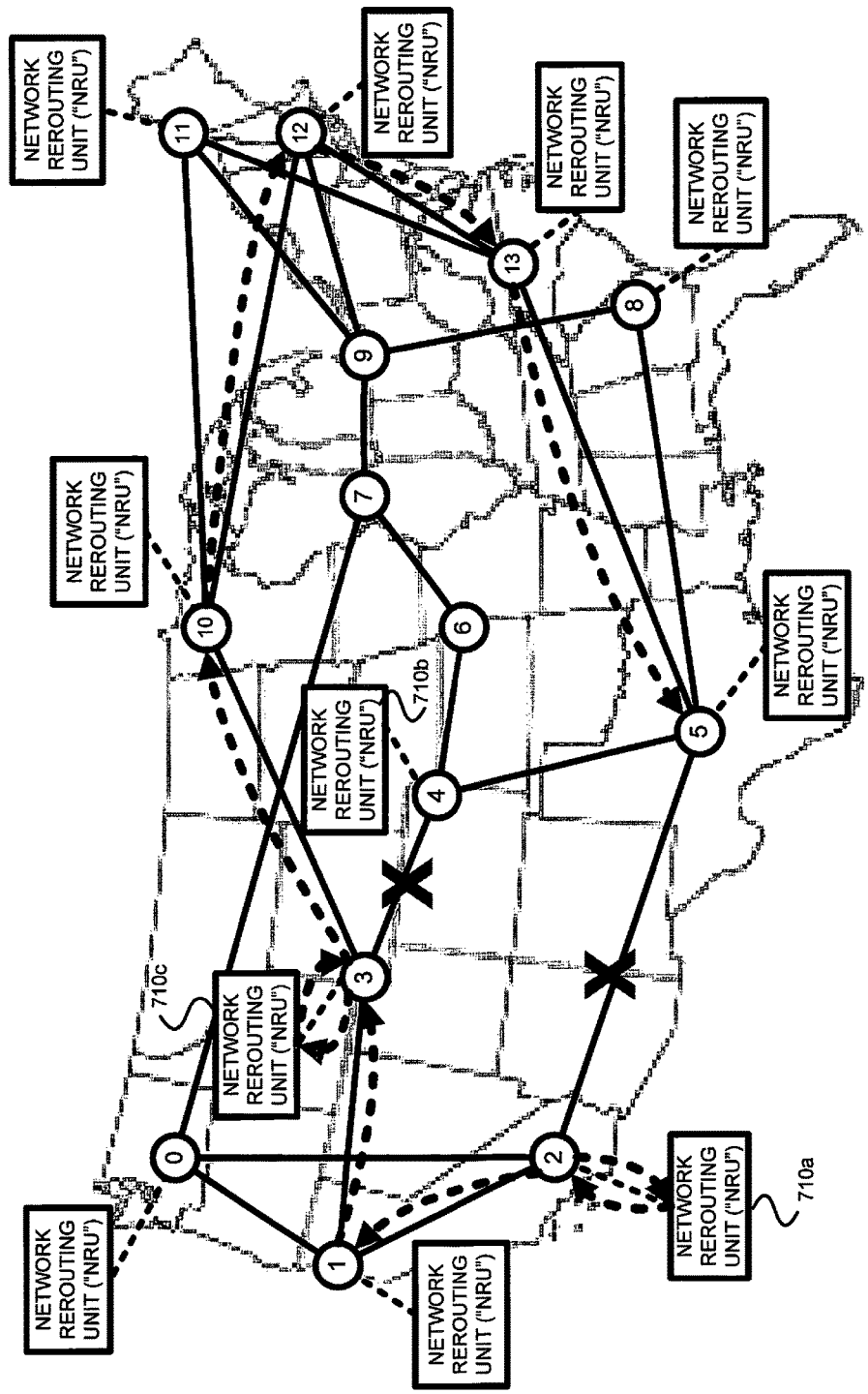

The second condition is when there is more than one failed link in the network 100 and a second redirection takes place. FIG. 9 illustrates such an example. In FIG. 9, packets are originally sent from R2 toward R4. The first link failure on link R2-R5 would make R2 redirect the packets to its NRU 710a. NRU 710a learns this local failure and computes an alternative path as shown in FIG. 8, with NRU 710b being the intermediate node. However, when the packets travel to R3, another link failure on link R3-R4 is encountered. R3 would then forward these already encapsulated packets to its NRU 710c. NRU 710c sees the outer IP header showing NRU 710a to NRU 710b, while the inner IP header showing R2 to R5. NRU 710c learns one redirection happened at its local router R3 and link R3-R4 failed since packets destined to NRU 710b should take link R3-R4 under normal operation. NRU 710c also learns there is a remote failure at R2 because the inner header indicates the original destination is R5, but one redirection happened at R2/NRU 710a according to the outer header. Considering this information in combination with the network topology, NRU 710c can learn the remote link R2-R5 also failed.

Learning remote link failures allows some NRUs to compute alternative paths to bypass more than one failed link. FIG. 9 shows how NRU 710c can compute an alternative path R2→R1→R3→R10→R12→R13→R5 (depicted with dashed arcs) to bypass the two failed links. It also allows the NRUs to actively compute the alternative paths and update their forwarding rules without local link failure. The advantage of this is that traffic can be re-routed even before the packets reach the failed link, thereby saving both latency and bandwidth.

§ 5.4.3.6 Learning More Failed Links

While the above schemes can handle all single and double link failures properly, it is possible to have multi-link failures with more than two links failing simultaneously. To handle such scenarios, failed link information a certain NRU has learned can be added to (e.g., appended in) the redirected packets to the next NRU, or sent in separate packet(s). In this way, if an unexpected link failure is encountered on the way to the next NRU, the NRU associated with the newly encountered failed link could also learn of the failed link(s) these redirected packets have encountered. By doing so, the failed link information can be accumulated and propagated to any NRU of a newly encountered failed link, and this NRU would be more knowledgeable than previous NRUs. This NRU could exploit this additional knowledge to bypass more failed links.

This additional information does not have to be added to every single packet; instead, the next NRU could send an acknowledgement after receiving packets with the latest information regarding all the failed links. If an acknowledgement is received, the previous NRU could stop adding additional information to the packets to save bandwidth and speed up packet processing.

§ 5.5 Refinements, Alternatives and Extensions

§ 5.5.1 Prefix Compression

Since NRU only cares about the routers and routes inside the running network for the purpose of link failure recovery, the NRU might consider only the IP addresses of the routers and NRUs when it comes to backup path computation. However, the routes of all prefixes exchanged in the network could be significantly more than the routes inside the network. Computing and updating forwarding rules for all the possible prefixes would be overwhelming to the NRUs and slow down the processing speed at each NRU. To solve this problem, the NRUs may adopt a two-stage forwarding policy to compress the prefixes which allows them to focus on only routes in the network.

Figure 10:
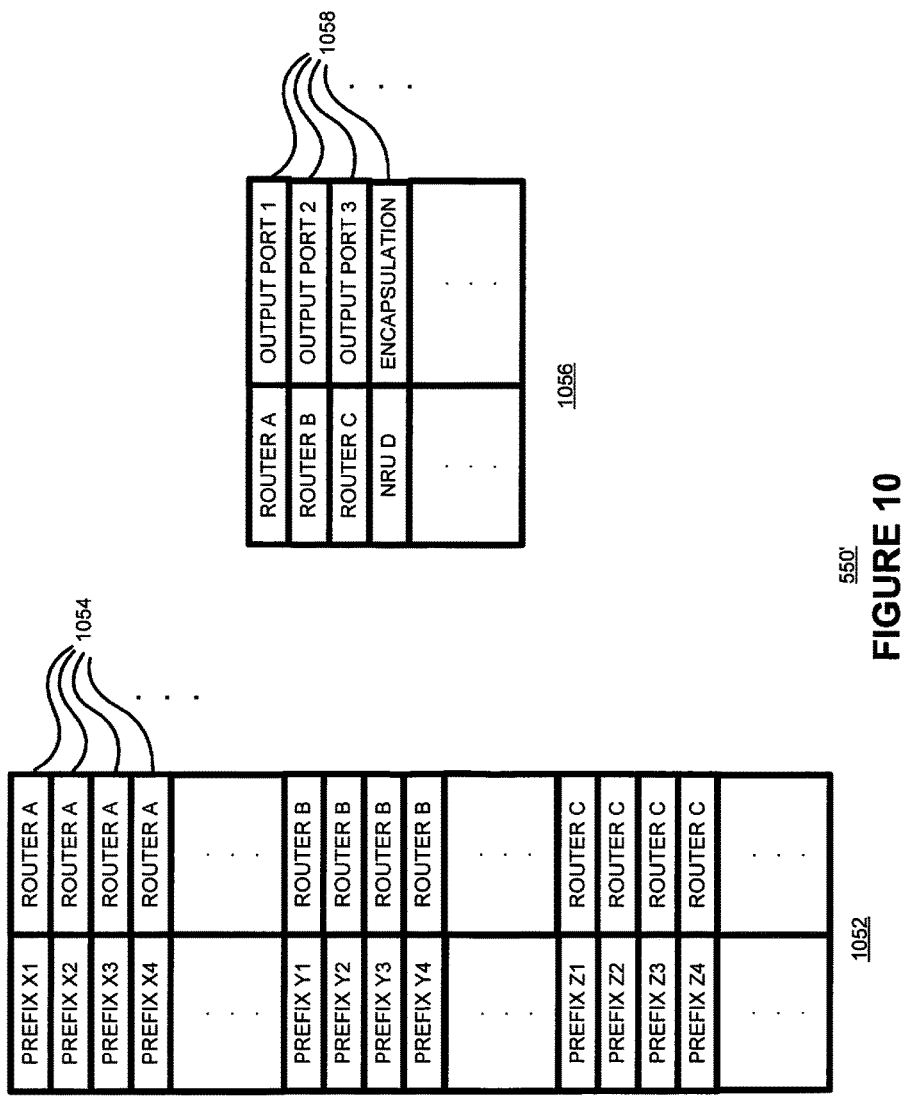
FIG. 10 illustrates an example two table data structure consistent with the present invention.

Referring to FIG. 10, in some example embodiments consistent with the present invention, each NRU includes a first table 1052 and a second table 1056. The first table 1052 has a plurality of entries 1054, each of the plurality of entries mapping an address prefix to a router. The second table 1056 has a plurality of entries 1058, each of the plurality of entries 1058 mapping a router to an output port. That is, the two-stage forwarding is composed of two tables. The first table includes all the prefixes exchanged in the network. This can be obtained by participating in the routing protocol as mentioned before. Each entry in this table maps a certain prefix to a router's IP address in the network, it is the router that is the last hop for this prefix before exiting the network. The second table includes the IP addresses of all the routers and NRUs in the network. Each entry in the second table indicates how to forward the packets toward a specific router or NRU in the network. Since the NRUs always'encapsulate a packet before sending it out, the forwarding rules in the second table may include when and how to encapsulate packets for different destinations.

Since the prefix-router mapping in the first table stays constant most of the time, it is only updated it when changes are indicated by the routing protocol. Any packet that arrives at a NRU will then be matched in the first table and sent to the second table for encapsulation. The second table is updated whenever a new link failure is learned as indicated in the packet header from the re-directed packets. This can be easily achieved by using p4 supported NICs.

§ 5.5.2 Distributed NRU Functionality

Referring back to FIG. 2, note that the acts of (1) identifying local failed link, and (2) computing an alternative path only need to be done once, for the first redirected packet of each failed local link. After the first packet is processed and the forwarding rules are updated at the NRU, subsequent packets affected by the same failed link can simply be directly tunneled to the intermediate node. For example, if the functions of the NRU are distributed across a server and a smart NIC, the first packet may be processed by the server. The server can update its forwarding table(s) and download the updated forwarding table information to the smart NIC. Then, subsequent packets with the same destination address can be handled by the smart NIC, without needing to be handled by the server.

§ 5.6 Conclusions

Example embodiments consistent with the present invention provide network resilience as a plug-in network function to enable link failure recovery in a running IP network. The emergence of Network Function Virtualization (NFV) provides great flexibility and facilitates new network designs and deployment. With tools such as Data Plane Development Kit ("DPDK") from Intel, smart NICs, or netFPGA, one can easily prototype and deploy new network functions, as well as migrate network functions if needed. This opens the possibility to offload link failure recovery from the router design and instead provide it as a network function. This advantage minimizes the modification to existing routers and can be deployed faster which significantly reduces the cost and time to deploy. In addition, making changes to network functions is much easier and more agile as it takes place at software level and it is not limited by vendor specific devices.

The present inventors evaluated the feasibility and performance of example embodiments consistent with the present invention with both high level simulation and simple test-bed implementation.

The simulation was done by feeding different topologies as input. Link failures were then simulated by purposely removing links from the topologies. All the combinations of certain number of simultaneous link failures were simulated. For example, in a network with 20 links, there are 1140 combinations for three-link failures. Among all the link failure combinations, only those where the network stays connected after the link failures were used.

In the simulation, each router only computed the shortest paths and maintained a forwarding table of the output ports for other nodes in the topology. Whenever a router detected that one of its link is down, it forwarded all the affected packets to its own server. The behavior of each NRU was simulated. Upon receiving packets redirected from its own router or tunneled from other NRUs, the NRU analyzed the packet header and updated its forwarding table if needed. It then decapsulated and re-encapsulated the packets before forwarding them back to the network. The topology profiles included NSFNet (with 14 nodes and 21 links), COST239 (with 11 nodes and 26 links) and Exodus (with 22 nodes and 38 links).

While the NRUs were able to aid the failure recovery, there are a few problems if the packets traverse too many NRUs on the way to the final destinations. First, there is only one link per NRU, the link could become the bottleneck when there are too many packets that need to be forwarded to that specific NRU. The chance of this happening becomes higher when the average number of NRUs visited per packet increases. Second, Since the NRUs may need to perform path computation and forwarding table updates each time a packet with new header arrives, additional latency could be added. Therefore, the present inventors examined the average number of NRUs used under different number of simultaneous link failures.

The average number of NRUs visited was found to increase when there were more simultaneous link failures in the network. This is mainly because the chance of encountering another failed link after being forwarded by the previous NRU increases when there are more link failures. As a result, more local re-directions are triggered. In addition, when more links fail simultaneously, the backup paths are more likely to be composed of multiple NRUs in order to bypass all failed links. However, the average number of NRUs visited was small and increased slowly with increased number of simultaneous link failures. Furthermore, when the size of the network is large, or the link density is high, the average number of NRUs visited grows slower.

The final backup paths taken by the re-directed packets could deviate from the shortest paths after removing all failed link(s). Despite the goal of the NRUs to compute the shortest backup paths to bypass the failed link, packets could encounter a new failed link when there is more than one link failure in the network and get forwarded onto another backup path computed by the second NRU. When this happens, the backup paths are "stretched" and could result in a longer backup paths. Base on simulations, the inventors found that the average path stretch is small, indicating most packets actually take the shortest paths after removing all failed links. This echoes the previous result that only very few packets need to traverse more than one NRUs even when there are multiple failed links. Similar to the average number of NRUs visited, the path stretch also grew slower when the network was large or had dense connections in the network.

The present inventors also implemented an example NRU using a P4 supported NIC from Netronome, together with a controller for backup path computation and forwarding rule updates. There are three major parts that could impact the throughput or delay at a NRU: (1) backup path computation; (2) decapsulation and encapsulation; and (3) rule updates.

The computation time for the backup paths heavily depends on the size of the network. In the three topologies used in the simulation, the time for computing all shortest paths was around 0.1-1 ms with NetworkX's Python implementation. This value can be further reduced when lower level languages such as C are used to optimize the path computation.

Decapsulation and encapsulation can be done at line-rate with most P4 supported NICs. In the test-bed, the 10 Gbps P4 supported NIC was found to perform decapsulation and encapsulation very close to 10 Gbps. This was done by defining an encapsulation header and a customized action. The present inventors defined the encapsulation header with the same format as regular 20-byte IP header, and the customized action was performed to insert this encapsulation header in between Ethernet and original IP header when redirected packers arrived. Since this did not involve any packet payload operation, the process time is payload-independent.

Rule installation was the most time-consuming components in the test-bed as the current rule update framework supported by Netronome was through RPC calls. This introduced significant delay because of all the overload from the underlying network stack. Based on the present inventors' measurement, the throughput of rule installation with RPC calls was 1.5 k per second. While this number seems large in the test-bed, the present inventors believe it can be significantly reduced when better APIs are available that allow the controller to communicate with p4 card directly.

Thus, the inventors' primary evaluation indicated that the number of NRUs used in alternative paths increases with number of simultaneous link failures. However, the number is small and increases slowly when there are more links in the network. Despite the possibility of multiple unexpected packet redirections when there are multiple link failures, the final path stretch is still small compared to the new shortest paths. Since encapsulation can be done in line rate with today's smart NICs, the throughput is high. However, a short latency may be experienced during encapsulation rule update in the forwarding table(s).

What is claimed is:

1. A computer-implemented method for providing resilience in a communications network including a plurality of routers and communications links between at least some of the plurality of routers, the method comprising:
   a) associating a network rerouting unit (NRU) with each of the plurality of routers;
   b) configuring each router so that if a link directly connected to the router fails, the router redirects any packets whose next hop is a port terminating an end of the failed link to the NRU associated with the router;
   c) executing a routing protocol on each of the NRUs whereby each NRU will learn a topology of the communications network;
   d) receiving by a first NRU, a packet redirected from the router associated with the first NRU; and
   e) responsive to receiving, by the first NRU, the packet redirected from the router associated with the first NRU,
      1) identifying a link directly connected to the router as a failed link using (i) a destination address in the redirected packet, and (ii) the topology of the network learned by the first NRU,
      2) determining an alternative path to the destination address of the redirected packet bypassing the identified failed link, and
      3) tunneling the redirected packet to an intermediate node on, or associated with, the alternative path using encapsulation.

2. The computer-implemented method of claim 1 wherein the intermediate node is determined by the first NRU such that both (1) the intermediate node does not include the identified failed link, and (2) a lowest cost path from the intermediate node to the destination address of the redirected packet does not include the identified failed link.

3. The computer-implemented method of claim 1 further comprising:
   f) receiving, by the NRU associated with the intermediate node, the redirected packet tunneled; and
   g) responsive to receiving the redirected packet tunneled, determining, by the NRU associated with the intermediate node, the identified failed link even if the identified failed link is not directly connected with the intermediate node, using (i) a header of the encapsulation, (ii) a header of the redirected packet, and (iii) the topology of the communications network learned by the NRU associated with the intermediate node.

4. The computer-implemented method of claim 1 further comprising:
   adding, by the first NRU, information identifying the identified failed link to the redirected packet, wherein the information is added before tunneling the redirected packet to the intermediate node on or associated with the alternative path using encapsulation.

5. The computer-implemented method of claim 1 further comprising:
   adding, by the first NRU, information identifying the identified failed link to the at least one new packet; and
   tunneling the at least one new packet to the intermediate node on or associated with the alternative path using encapsulation.

6. The computer-implemented method of claim 1 further comprising:
   determining whether or not there is a router in which both
      (1) a shortest path from the first NRU to the router does not include any known failed link, including the identified failed link, and (2) a shortest path from the router to a final destination of the redirected packet does not include any known failed link, including the identified failed link; and
   responsive to a determination that there is a router in which both (1) a shortest path from the first NRU to the router does not include any known failed link, including the identified failed link, and (2) a shortest path from the router to a final destination of the redirected packet does not include any known failed link, including the identified failed link,
      setting the router as the intermediate node, and
   otherwise, responsive to a determination that there is no router in which both (1) a shortest path from the first NRU to the router does not include any known failed link, including the identified failed link, and (2) a shortest path from the router to a final destination of the redirected packet does not include any known failed link, including the identified failed link,
      setting another NRU as the intermediate node.

7. The computer-implemented method of claim 6 wherein the other NRU is a farthest one that the first NRU can reach without using any known failed links.

8. The computer-implemented method of claim 1 wherein the first NRU includes a first table having a plurality of entries, each of the plurality of entries of the first table mapping an address prefix to a router, and a second table having a plurality of entries, each of the plurality of entries of the second table mapping a router to either (A) an output port, or (B) an encapsulation rule.

9. A network rerouting unit (NRU) for providing resilience in a communications network including a plurality of routers and communications links between at least some of the plurality of routers, the NRU being associated with one of the plurality of routers which is configured so that if a link directly connected to the router fails, the router redirects any packets whose next hop is a port terminating an end of the failed link to the NRU, the NRU comprising:
   a) a routing protocol module through which the NRU learns a topology of the communications network; and
   b) an input adapted to receive a packet redirected from the router associated with the NRU; and
   c) a packet processor adapted to, responsive to receiving the packet redirected from the router associated with the NRU,
      1) identify a link directly connected to the router as a failed link using (i) a destination address in the redirected packet, and (ii) the topology of the network learned by the NRU,
      2) determine an alternative path to the destination address of the redirected packet bypassing the identified failed link, and
      3) tunnel the redirected packet to an intermediate node on, or associated with, the alternative path using encapsulation.

10. The NRU of claim 9 wherein the NRU is provided on a server.

11. The NRU of claim 9 wherein the server further provides content caching.

12. The NRU of claim 9 wherein the NRU is provided on a smart network interface card (NIC) on its associated router.

13. NRU of claim 9 wherein the intermediate node is determined by the NRU such that both (1) the intermediate node does not include the identified failed link, and (2) a lowest cost path from the intermediate node to the destination address of the redirected packet does not include the identified failed link.

14. The NRU of claim 9 wherein the packet processor is further adapted to, responsive to receiving the packet redirected from the router associated with the NRU,
add, information identifying the identified failed link to the redirected packet, wherein the information is added before tunneling the redirected packet to the intermediate node on or associated with the alternative path using encapsulation.

15. The NRU of claim 9 wherein the packet processor is further adapted to, responsive to receiving the packet redirected from the router associated with the NRU,
add information identifying the identified failed link to the at least one new packet, and
tunnel the at least one new packet to the intermediate node on or associated with the alternative path using encapsulation.

16. The NRU of claim 9 wherein the packet processor is further adapted to, responsive to receiving the packet redirected from the router associated with the NRU,
determine whether or not there is a router in which both (1) a shortest path from the first NRU to the router does not include any known failed link, including the identified failed link, and (2) a shortest path from the router to a final destination of the redirected packet does not include any known failed link, including the identified failed link; and
responsive to a determination that there is a router in which both (1) a shortest path from the first NRU to the router does not include any known failed link, including the identified failed link, and (2) a shortest path from the router to a final destination of the redirected packet does not include any known failed link, including the identified failed link,
set the router as the intermediate node, and
otherwise, responsive to a determination that there is no router in which both (1) a shortest path from the first NRU to the router does not include any known failed link, including the identified failed link, and (2) a shortest path from the router to a final destination of the redirected packet does not include any known failed link, including the identified failed link,
set another NRU as the intermediate node.

17. The NRU of claim 16 wherein the other NRU is a farthest one that the NRU can reach without using any known failed links.

18. The NRU of claim 9, further comprising:
a computer-readable medium storing a first table having a plurality of entries, each of the plurality of entries of the first table mapping an address prefix to a router, and a second table having a plurality of entries, each of the plurality of entries of the second table mapping a router to an output port.

19. A system of network rerouting units (NRUs) for providing resilience in a communications network including a plurality of routers and communications links between at least some of the plurality of routers, each of the NRUs being associated with one of the plurality of routers, each of which is configured so that if a link directly connected to the router fails, the router redirects any packets whose next hop is a port terminating an end of the failed link to its associated NRU, each of the NRUs comprising:
a) a routing protocol module through which the NRU learns a topology of the communications network; and
b) an input adapted to receive a packet redirected from the router associated with the NRU; and
c) a packed processor adapted to, responsive to receiving the packet redirected from the router associated with the NRU,
1) identify a link directly connected to the router as a failed link using (i) a destination address in the redirected packet, and (ii) the topology of the network learned by the NRU,
2) determine an alternative path to the destination address of the redirected packet bypassing the identified failed link, and
3) tunnel the redirected packet to an intermediate node on, or associated with, the alternative path using encapsulation.

20. A non-transitory computer-readable storage medium storing processor-executable instructions which, when executed by at least one processor, cause the at least one processor to perform a method for providing resilience in a communications network including a plurality of routers and communications links between at least some of the plurality of routers, the method comprising:
a) associating a network rerouting unit (NRU) with each of the plurality of routers;
b) configuring each router so that if a link directly connected to the router fails, the router redirects any packets whose next hop is a port terminating an end of the failed link to the NRU associated with the router;
c) executing a routing protocol on each of the NRUs whereby each NRU will learn a topology of the communications network;
d) receiving by a first NRU, a packet redirected from the router associated with the first NRU; and
e) responsive to receiving, by the first NRU, the packet redirected from the router associated with the first NRU,
1) identifying a link directly connected to the router as a failed link using (i) a destination address in the redirected packet, and (ii) the topology of the network learned by the first NRU,
2) determining an alternative path to the destination address of the redirected packet bypassing the identified failed link, and
3) tunneling the redirected packet to an intermediate node on, or associated with, the alternative path using encapsulation.

\* \* \* \* \*